(No Model.)

W. EBERHARD.
CUSPIDOR STAND.

No. 290,759. Patented Dec. 25, 1883.

Attest
Thos. E. Crail
George F. Robinson

Inventor
William Eberhard
By Bradford Howland
Attorney

UNITED STATES PATENT OFFICE.

WILLIAM EBERHARD, OF AKRON, OHIO, ASSIGNOR OF ONE-HALF TO GEORGE T. FORD, OF SAME PLACE.

CUSPIDOR-STAND.

SPECIFICATION forming part of Letters Patent No. 290,759, dated December 25, 1883.

Application filed November 5, 1883. (No model.)

*To all whom it may concern:*

Be it known that I, WILLIAM EBERHARD, a citizen of the United States, residing at Akron, in the county of Summit and State of Ohio, have invented a new and useful Improvement in Cuspidor-Stands, of which the following is a specification.

The general nature of my invention is a low stand of suitable dimensions for a cuspidor-holder provided with casters, and formed with an upwardly-projecting flange at the circumference, and having the inner sides of the flange and the bottom of the stand formed to receive and retain pieces of rubber or cushions.

Figure 1:
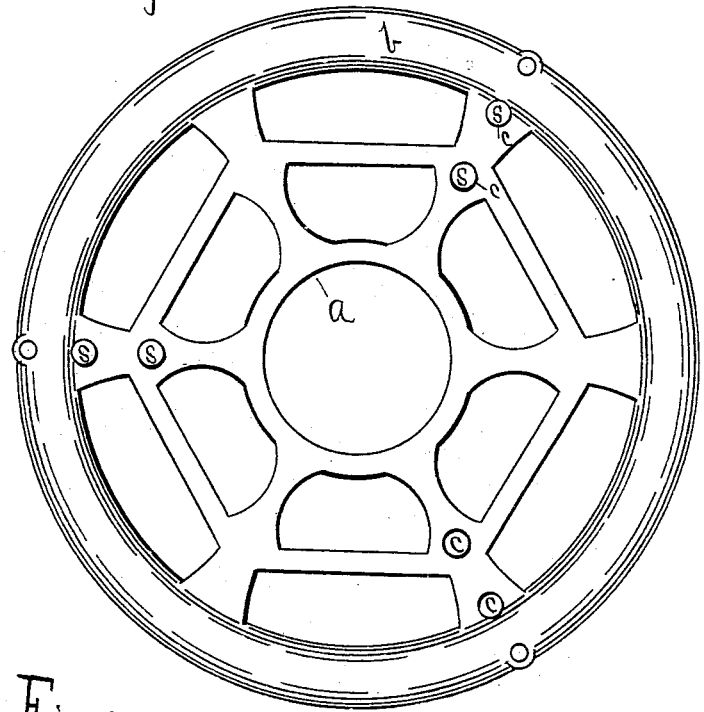
Figure 2:
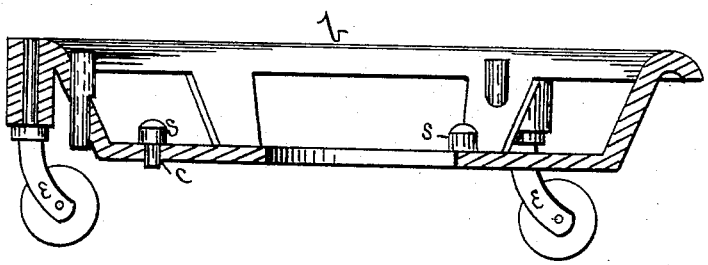

In the drawings forming a part of this specification, Figure 1 is a plan, and Fig. 2 is a vertical section.

The stand $a$ may be of cast metal, and is formed with a flange or raised circumference, $b$, to retain the cuspidor on the stand. It is not essential that the flange should entirely surround the stand; but I prefer that it should be so formed. It is provided with ordinary furniture-casters, $e$, on which it is supported, and may easily be moved from place to place on the floor of a room. Suitable holes, $c$, are formed in its bottom and in the inner sides of its circumference or flange $b$, to receive and retain cushions, $s$ of rubber or other suitable material, to prevent the cuspidor, which is to be placed on the stand within flange $b$, from coming in contact with the body of the stand.

I claim as my invention—

1. As an article of manufacture, a cuspidor-stand provided with casters $e$, and formed with a flange, $b$, and with suitable holes, $c$, in the bottom of the stand and the inner sides of the flange $b$, to hold cushions $s$, substantially as described.

2. A cuspidor-stand formed with a flange, $b$, and provided with casters $e$ and cushions $s$ on its bottom and on the inner sides of said flange, substantially as described.

WILLIAM EBERHARD.

Witnesses:
BRADFORD HOWLAND,
D. P. COWL.